United States Patent
Mason (10) Patent No.: US 9,839,182 B2
(45) Date of Patent: Dec. 12, 2017

(54) HORTICULTURE LIGHTING CONTROLLER METHODS

(71) Applicant: IP Holdings, LLC, Vancouver, WA (US)

(72) Inventor: Martin R. Mason, Vancouver, WA (US)

(73) Assignee: IP Holdings, LLC, Vancouver, WA (US)

( * ) Notice: Subject to any disclaimer, the term of this patent is extended or adjusted under 35 U.S.C. 154(b) by 242 days.

(21) Appl. No.: 14/696,487

(22) Filed: Apr. 27, 2015

(65) Prior Publication Data

US 2016/0165809 A1   Jun. 16, 2016

Related U.S. Application Data

(63) Continuation-in-part of application No. 29/511,532, filed on Dec. 11, 2014, now abandoned.

(51) Int. Cl.
  *H05B 37/00* (2006.01)
  *A01G 9/20* (2006.01)
  *A01G 7/04* (2006.01)

(52) U.S. Cl.
  CPC ............ *A01G 7/045* (2013.01); *Y02P 60/146* (2015.11)

(58) Field of Classification Search
  CPC .............................. A01G 7/045; Y02P 60/146
  See application file for complete search history.

(56) References Cited

U.S. PATENT DOCUMENTS

| | | | |
|---|---|---|---|
| 3,446,384 A | 5/1969 | Blackman | |
| 6,491,327 B1 | 1/1970 | Goldwater | |
| D216,911 S | 3/1970 | Specht | |
| 3,724,702 A | 4/1973 | Kay | |
| D254,846 S | 4/1980 | Wood | |
| 4,297,818 A | 11/1981 | Anderson | |
| D267,516 S | 1/1983 | Rambusch | |
| D277,027 S | 1/1985 | Waltz | |
| D277,028 S | 1/1985 | Waltz | |

(Continued)

FOREIGN PATENT DOCUMENTS

| CN | ZL 201530033687.4 | 7/2015 |
|---|---|---|
| CN | ZL 201530033112.2 | 8/2015 |
| CN | ZL201530426209 | 10/2015 |

OTHER PUBLICATIONS

Motorized damper, image post date May 22, 2012, site visited Jun. 11, 2016, <https://www.tineye.com/search/585a79138b8552a0de2f919391f5c3daa879a9eb/>.

Residential Product Catalog, image post date May 2011, site visited Jun. 11, 2016, <htto://www.cleanwaterpa.com/sites/default/files/u1/pdf/AO%20snutg%20water%20heater%20catalog.pdf>.

Yamaja R6 OEM ECU CDI engine control unit module computer YZF-R6, image post date 2008, site visited Jun. 22, 2016, <http://www.ebay.co.uk/itm/272262109754?clk_rvr_id=1050641016140&rmvSB=true>.

(Continued)

*Primary Examiner* — Minh Trinh
(74) *Attorney, Agent, or Firm* — J. Douglas Wells (57) ABSTRACT

Methods of installing and using a horticulture lighting controller having a substantially rectangular shaped housing with an in-operation removable front cover panel, the methods preferably comprising mounting the fully assembled lighting controller to a mounting surface without first having to remove any component of the controller, remove a front or outer cover of the controller, perform any wiring connections on a backside or backplane of the controller chassis, or pre-wire any connections whatsoever, and then removing the front cover panel to connect the controller to a power supply circuit.

16 Claims, 8 Drawing Sheets

(56) References Cited

U.S. PATENT DOCUMENTS

| | | |
|---|---|---|
| 4,592,269 A | 6/1986 | Lamparter |
| 4,615,263 A | 10/1986 | Titterud |
| D288,857 S | 3/1987 | Spaine |
| D296,584 S | 7/1988 | Hilton |
| D300,655 S | 4/1989 | Buehler |
| D306,430 S | 3/1990 | McNutt |
| 4,909,385 A | 3/1990 | Blymiller |
| 5,098,046 A | 3/1992 | Webb |
| D327,317 S | 6/1992 | Courchesne |
| D332,139 S | 12/1992 | Courchesne |
| D332,942 S | 2/1993 | Julien |
| D342,235 S | 12/1993 | Shotey |
| D350,532 S | 9/1994 | Phelps |
| D352,126 S | 11/1994 | Ruud |
| 5,501,634 A | 3/1996 | Wilder |
| 5,591,080 A | 1/1997 | Ward |
| D383,438 S | 9/1997 | Gerber |
| D384,336 S | 9/1997 | Gerber |
| 5,662,522 A | 9/1997 | Waltz |
| 5,665,938 A | 9/1997 | Boshear |
| 5,669,524 A | 9/1997 | Loedel |
| 5,735,086 A | 4/1998 | Fordahl |
| 5,773,760 A | 6/1998 | Stark |
| D414,460 S | 9/1999 | Hughes |
| D416,232 S | 11/1999 | Einck |
| 6,120,118 A | 9/2000 | Dean |
| D433,995 S | 11/2000 | Romano |
| 6,152,579 A | 11/2000 | Reed |
| D436,163 S | 1/2001 | Peterson |
| D442,273 S | 5/2001 | Pestell |
| 6,293,862 B1 | 9/2001 | Jafine |
| 6,300,564 B1 | 10/2001 | Moraes |
| D456,938 S | 5/2002 | Wardenburg |
| 6,397,781 B1 | 6/2002 | Bellington |
| 6,514,135 B1 | 2/2003 | Kelly |
| 6,549,405 B2 | 4/2003 | Wharton |
| 6,686,535 B1 | 2/2004 | Evans |
| 6,723,922 B1 | 4/2004 | Shotey |
| D504,425 S | 4/2005 | Ritson |
| 6,969,130 B2 | 11/2005 | Newton |
| D517,006 S | 3/2006 | Bessmertny |
| D517,507 S | 3/2006 | Johnson |
| D520,665 S | 5/2006 | Jiang |
| D521,171 S | 5/2006 | Skegin |
| 7,054,442 B2 | 5/2006 | Weikle |
| D531,961 S | 11/2006 | Greenfield |
| D537,570 S | 2/2007 | Sanders |
| 7,217,308 B2 | 5/2007 | Thanheiser |
| D544,139 S | 6/2007 | Hargreaves |
| D549,316 S | 8/2007 | O'Hagin |
| D556,314 S | 11/2007 | Daniels, II |
| 7,294,017 B2 | 11/2007 | Scott |
| D571,450 S | 6/2008 | Brown |
| D573,105 S | 7/2008 | Richey |
| D573,524 S | 7/2008 | Smith |
| 7,476,807 B1 | 1/2009 | Gretz |
| D587,797 S | 3/2009 | Blanchard |
| D601,098 S | 9/2009 | Phelps |
| 7,609,512 B2 | 10/2009 | Richardson |
| 7,633,008 B2 | 12/2009 | Kanou |
| D612,040 S | 3/2010 | Daniels |
| D618,332 S | 6/2010 | Kimura |
| D618,780 S | 6/2010 | Williams, Sr. |
| D624,639 S | 9/2010 | Dilorenzo |
| D625,800 S | 10/2010 | Daniels |
| D638,307 S | 5/2011 | Rossi |
| D641,707 S | 7/2011 | Czarnecki |
| D648,282 S | 11/2011 | Czarnecki |
| D651,566 S | 1/2012 | Sedberry |
| D653,745 S | 2/2012 | Gregg |
| D656,601 S | 3/2012 | Roderique |
| D657,748 S | 4/2012 | Hargreaves |
| 8,153,895 B2 | 4/2012 | Drane |
| D660,252 S | 5/2012 | Hargreaves |
| 8,205,401 B2 | 6/2012 | Ward |
| D662,870 S | 7/2012 | Russ |
| D662,896 S | 7/2012 | Czarnecki |
| 8,217,262 B2 | 7/2012 | Lank |
| 8,251,253 B1 | 8/2012 | Cleghorn |
| D666,707 S | 9/2012 | Eikhoff |
| D669,211 S | 10/2012 | Larson |
| D672,450 S | 12/2012 | Milks |
| 8,385,113 B2 | 2/2013 | Pinkerton |
| D680,419 S | 4/2013 | Green |
| D690,065 S | 9/2013 | Shoenster |
| D693,051 S | 11/2013 | Klu |
| D697,666 S | 1/2014 | Grote |
| D700,611 S | 3/2014 | Boldetti |
| D704,815 S | 5/2014 | Butler |
| D704,816 S | 5/2014 | Butler |
| D704,817 S | 5/2014 | Butler |
| D705,420 S | 5/2014 | Eichelberg |
| D722,976 S | 2/2015 | Okado |
| D724,715 S | 3/2015 | Isshiki |
| D731,047 S | 6/2015 | Leonard |
| D736,198 S | 8/2015 | Merbeth |
| D736,365 S | 8/2015 | Breneman |
| D737,421 S | 8/2015 | Jannello |
| D739,595 S | 9/2015 | Reynolds |
| D743,520 S | 11/2015 | Sinur |
| D744,138 S | 11/2015 | O'Leary |
| D744,142 S | 11/2015 | Bobel |
| D744,143 S | 11/2015 | Bobel |
| D744,144 S | 11/2015 | Bobel |
| D744,685 S | 12/2015 | Zhan |
| D745,993 S | 12/2015 | Reynolds |
| D747,541 S | 1/2016 | Dietel |
| D752,770 S | 3/2016 | Kuhn |
| D753,311 S | 4/2016 | Long |
| D753,312 S | 4/2016 | Long |
| D760,946 S | 7/2016 | Hobson |
| D761,727 S | 7/2016 | Arends |
| D762,568 S | 8/2016 | Arends |
| D766,177 S | 9/2016 | Barajas |
| 2001/0049261 A1 | 12/2001 | McKee |
| 2003/0054754 A1 | 3/2003 | McKee |
| 2003/0153262 A1 | 8/2003 | Mantyla |
| 2005/0233691 A1 | 10/2005 | Horton |
| 2006/0157092 A1 | 7/2006 | Kramer |
| 2008/0210783 A1 | 9/2008 | Bissonnette |
| 2008/0296039 A1 | 12/2008 | Dinh |
| 2010/0184366 A1 | 7/2010 | Hassenstab |
| 2011/0284530 A1 | 11/2011 | Wood |
| 2011/0292624 A1 | 12/2011 | Tanaka |
| 2012/0212883 A1 | 8/2012 | Hargreaves |
| 2013/0115871 A1 | 5/2013 | Bourque |
| 2015/0289328 A1* | 10/2015 | Conrad .............. H05B 33/0863 315/152 |
| 2015/0342125 A1* | 12/2015 | Krijn ..................... A01G 7/045 315/152 |
| 2016/0161066 A1 | 6/2016 | Sung |
| 2016/0165809 A1 | 6/2016 | Mason |
| 2017/0034895 A1* | 2/2017 | Vogel ................. H05B 33/0845 |

OTHER PUBLICATIONS

Louvre Dampers, image post date Mar. 2010, site visited Jun. 11, 2016, <www.http://pumps.kerpump.com/asset/damper.pdf>.

SPM-F series Air regulation damper, image post date Jan. 14, 2014, site visited Jun. 11, 2016, <https://www.tineye.com/search/1d120de9ed460d7685f82916e431007f82916e431107f690f1824/>.

Dampers—Air measuring products—access doors, image post date Apr. 18, 2005-Nov. 18, 2014, site visited Jun. 11, 2016, <http://www.deicontrols.com/dampers/>.

Control Damper—Model 612, image post date 1955, site visited Jun. 11, 2016, <http://www.safeair-dowco.com/product/612.pdf>.

Control Damper—Model BDD image post date 1955, site visited Jun. 11, 2016, <http://www.safeair-dowco.com/product/BDD.pdf>.

* cited by examiner

HORTICULTURE LIGHTING CONTROLLER METHODS

CROSS-REFERENCE TO RELATED APPLICATION

This is a continuation-in-part of U.S. design patent application Ser. No. 29/511,532 filed on Dec. 11, 2014, and entitled HORTICULTURE LIGHTING CONTROLLER CHASSIS.

TECHNICAL FIELD OF THE INVENTION

This invention relates generally to a lighting controller ideally for use in hydroponic or indoor gardening applications, and, more particularly, to improved methods and apparatuses for a horticulture lighting controller chassis capable of simultaneously controlling operation of multiple horticulture growing lighting fixtures.

BACKGROUND OF THE INVENTION

Controlling high wattage lights presents unique problems. If you have more than two 1000 watt lights, for example, in a home or hobby indoor gardening setup, there is a problem of how to supply power to the lights and turn them on and off. A standard residential 120 volt circuit typically has a 15 amp rating, which means the circuit can support one high wattage light. A 1000 watt light draws about 9 amps at 120 volts (1100 watts divided by 120 volts equals 9 amps). On a 240 volt circuit the amperage is around 4.6 amps (1100 watts/240 volts=4.6 amps). Operating multiple lights, therefore, is simpler when wired as 240 volt lights because smaller gage (lower amperage rated) wiring may be used. In a typical residential 120 volt circuit, the power cords have three wires, comprising a black (power), a white (common or return), and a green (ground). In a typical three wire 240 volt circuit, as most routinely used for horticulture growing lights, there are three wires, comprising a black and a white (each 120 volts and of opposite phase from one another), and a green (common/ground). The 240 volt circuit allows for splitting the load between two wires—the black and white (power) wires.

Turning the high wattage lights on and off typically requires a timer that is capable of turning on and off the number of high wattage lights connected. Typical lighting controllers for the hydroponics industry use one or more relay to energize power outlets for connecting a particular (maximum) number of high wattage lights (or ballasts which then energize the connected lighting fixtures). A typical relay works like a manual switch in that it connects and disconnects two wires. However, the relay has a coil that makes the connection when power is applied, and the coil requires minimal current (amperage) compared to the high wattage lights. A typical relay may draw under 100 milliamps and therefore be capable of turning on and off numerous separate circuits.

Lighting controllers used for hydroponic and indoor gardening applications typically comprise a relay for turning on and off a higher amperage circuit which in turn powers a number of power outlets. Existing lighting controllers typically comprise a substantially rectangular box with a high amperage power connection. Many controllers utilize a high amperage appliance type power supply line with plug, and consequently require installation of a corresponding high amperage power outlet. Use of such high amperage appliance type plugs and corresponding power outlets is more expensive.

Controllers designed for hardwired power supply connection rather than use of a heavy duty high amperage appliance type plug (and power supply outlet) require means for connecting wiring to provide the high amperage power. Such controllers have heretofore required removal of a backside cover for pre-wiring the power connection to the controller unit (or chassis) prior to mounting the unit, or require connection of the power lines and reassembly of the controller unit prior to mounting. Typical existing controllers require mounting to a pair of studs or mounting the unit using two or more horizontally spaced fastening locations.

What is needed are new and innovative designs for a horticulture lighting controller chassis that offer improvements in cost, quality, delivery, performance, and/or feature content over existing lighting controller chassis. What is need are new and innovative methods and apparatuses for a horticulture lighting controller chassis capable of simultaneously controlling operation of multiple growing lighting fixtures that provide simplified designs and easier methods of installation, testing, and use.

The foregoing and other objectives, features, and advantages of the invention will be more readily understood upon consideration of the following detailed description of the invention taken in conjunction with the accompanying drawings.

BRIEF DESCRIPTION THE DRAWINGS

Elements in the figures have not necessarily been drawn to scale in order to enhance their clarity and improve understanding of these various elements and embodiments of the invention. Furthermore, elements that are known to be common and well understood to those in the industry such as electrical power connection are not necessarily depicted in order to provide a clear view of the various embodiments of the invention, thus the drawings are generalized in form in the interest of clarity and conciseness.

DETAILED DESCRIPTION THE DRAWINGS

Although preferred embodiments are described in the context of a twelve (12) light controller having a substantially rectangular shaped housing with an in-operation removable front cover panel incorporating an inclined top surface, and the housing comprising standoffs to allow air to circulate between the back of the controller housing (or chassis) and a (preferably vertical wall) mounting surface, separable inventive aspects in various embodiments are disclosed. The overall shape of the chassis may be other than rectangular in some embodiments. Other embodiments may comprise a different number of powered outlets for connection to lighting fixtures to be controlled. Various embodiments may employ materials different than the sheet metal folded to comprise the chassis. Less preferred embodiments may comprise a removable front cover (that is preferably removable without a need to disconnect any power supply wiring, and without a need to unfasten the chassis backplane from its mounting surface) that is differently shaped, for instance, omitting an inclined top surface and/or having differently shaped standoffs, or even omitting the mounting standoff flanges entirely.

In preferred embodiments, a method of installing and using a lighting controller comprises mounting the fully assembled lighting controller (without having to remove any component, remove a front or outer cover, perform any wiring connections on a backside or backplane of the controller chassis, or pre-wire any connections whatsoever) to a wall, stud member, or other mounting surface; loosening or removing one or more fasteners or latch members retaining a front cover plate of the controller chassis; removing the front cover plate; connecting wiring to provide power to the controller; replacing the front cover plate; activating power to energize the wiring connected to provide power to the controller; optionally testing one or more of the lighting controller power outlets by plugging in to power a trigger cord corresponding to the power outlet to be tested and testing the voltage available at the powered outlet; plugging in at least one ballast into one of the controller power outlets (the ballast further connected to a lighting fixture powered by the ballast); and optionally inserting a timing appliance between the trigger cord and the power outlet providing power to the trigger cord (so as to set a schedule for on/off operation of the connected lighting fixture).

In preferred embodiments, mounting the fully assembled lighting controller comprises using a first fastener to hang the controller chassis on a mounting surface and a second fastener to further secure the chassis to the mounting surface. In preferred embodiments, the first fastener is used in a key-hole shaped cutout in a top flange of the chassis, and the second fastener is used in a slot- or oblong/oval-shaped cutout in a bottom flange of the chassis, where both fasteners when fastened secure the backplane of the chassis to the mounting surface, allowing for separate removal of a front cover plate of the lighting controller chassis.

In preferred embodiments, connecting power to the lighting controller comprises pulling wires into the already mounted chassis and connecting the power wires to terminal blocks or other connections within a backplane component assembly portion of the lighting controller chassis.

In preferred embodiments, replacing the front cover plate comprises re-attaching the front panel by setting the cover plate lower edge on a lower edge of the chassis backplane assembly, rotating the front cover onto the rest of the backplane assembly so that the lower edge of the front cover rests on the lower edge of the backplane assembly and upper edge rests against a corresponding mating upper surface of the backplane assembly, and replacing and/or tightening at least one fastener or latch member for retaining the front cover plate to the backplane assembly.

Figure 1:
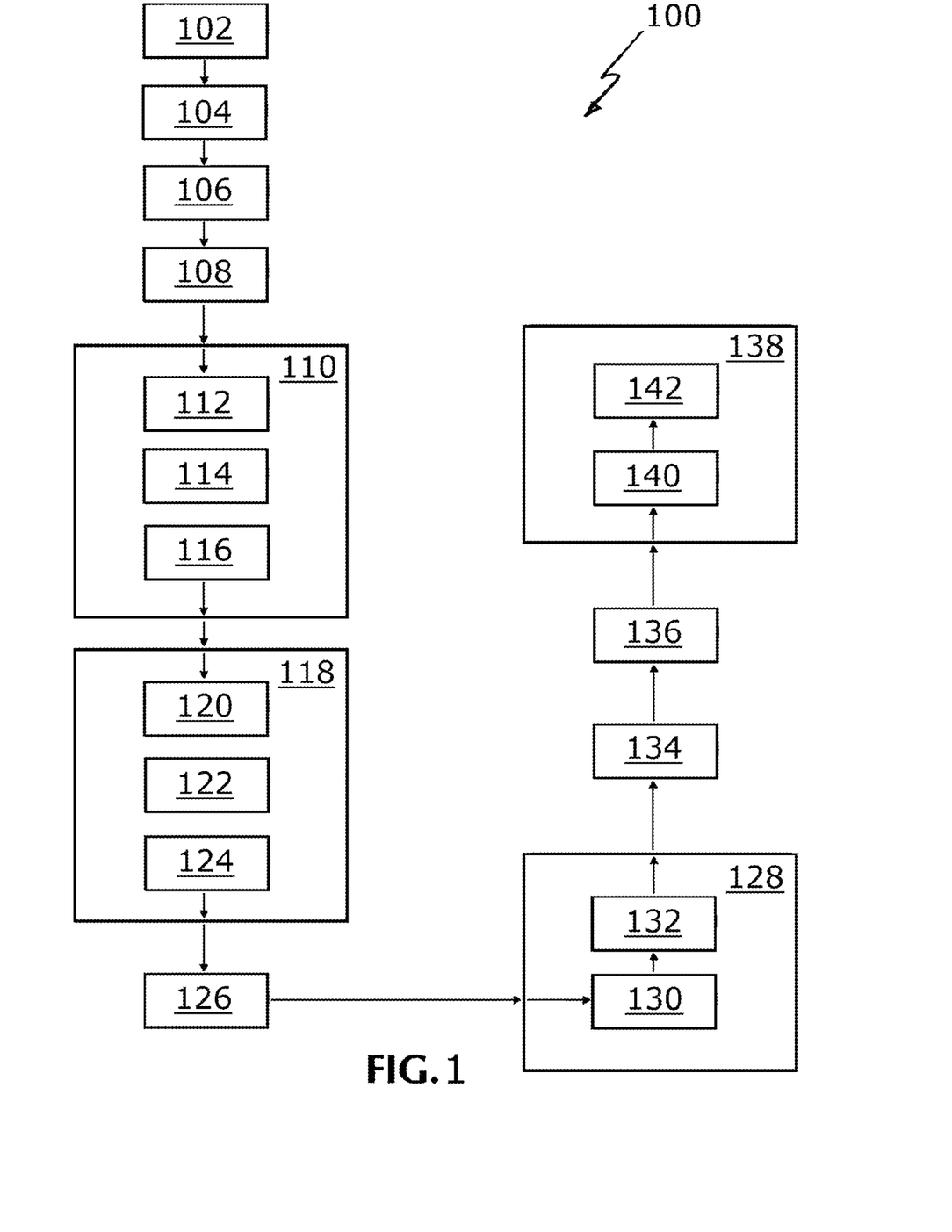
FIG. 1 shows a series of steps for installing and using a lighting controller, according to various preferred embodiments.

FIG. 1 shows a series of steps 100 for installing and using a lighting controller, according to various preferred embodiments. In preferred embodiments, a method of installing and using a lighting controller comprises: providing 102 an assembled lighting controller (such as a lighting controller 201 shown in FIG. 2); mounting 104 the fully assembled lighting controller 202 (preferably without having to remove any component (such as internal lighting controller components shown in FIG. 6), preferably without having to remove a front or outer cover (such as cover 502 shown in FIG. 5), preferably without having to perform any wiring connections on a backside or backplane of the controller chassis (such as wiring connections involved with any of the internal components shown in FIG. 5 or the backside or backplane 510 shown therein), or preferably without having to pre-wire any connections whatsoever) to a wall, stud member, or other (preferably vertical) mounting surface; loosening or removing 106 one or more fasteners or latch members retaining a front cover plate of the controller chassis (for example, loosening each one of seven (7) fasteners from fastening locations 524, 526, 518, 516, 508, 616, and 618 shown in FIG. 6 enough to release front cover 502 from the rest of the assembled lighting controller 202); removing 108 the front cover plate from the rest of the assembled lighting controller 202; connecting 110 wiring to provide power to the controller 202 (for example, as indicated by reference numeral 214 in FIG. 2, connecting wiring to an 80 amp circuit to provide power to the controller 202); replacing 118 the front cover plate (for example, comprising tightening each one of the seven (7) fasteners previously loosened to remove the front cover); activating 126 power to energize the wiring connected to provide power to the controller; optionally testing 128 one or more of the lighting controller power outlets 204 by plugging 130 a trigger cord 220, 218 in to an external power outlet 222, 216 corresponding to the particular controller power outlet 204 to be tested and testing/checking 132 the voltage available at the powered outlet 204 (for example, using a standard volt meter); plugging 134 in at least one ballast 208 into one of the controller power outlets 204 (the ballast further connected to a lighting fixture 212 (for example, by plugging 136 in the lighting fixture 212 via plug 210) powered by the ballast 208); and optionally inserting 138 a timing appliance 226, 224 between the trigger cord 220, 218 and the external power outlet 222, 216 providing power to the trigger cord 220, 218 (to allow for setting a schedule for on/off operation of the connected lighting fixture(s) 212). Inserting 138 a timing appliance may, for example, comprise inserting 140 a 120 volt timing appliance (such as timing appliance 226, 224) between each 120 volt outlet (such as external power outlet 222, 216) and each trigger cord (such as trigger cord 220, 218).

In preferred embodiments, mounting 104 the fully assembled lighting controller 202 comprises using a first fastener (such as a screw, nail, hook, wire, extrusion, or other type of member extendable through a hole) to hang the controller chassis on a mounting surface and a second fastener (possibly similar to the first fastener) to further secure the chassis to the mounting surface. In preferred embodiments, the first fastener is used in a key-hole shaped cutout 312 in a top flange 306 of the chassis 202 as shown in FIG. 3, and the second fastener is used in a slot- or oblong/oval-shaped cutout 410 in a bottom flange 330 of the chassis 202 as shown in FIG. 4, where both fasteners when fastened secure the backplane 510 of the chassis 202 to the mounting surface, allowing for separate removal of a front cover plate 502 of the lighting controller chassis 202.

Figure 5:
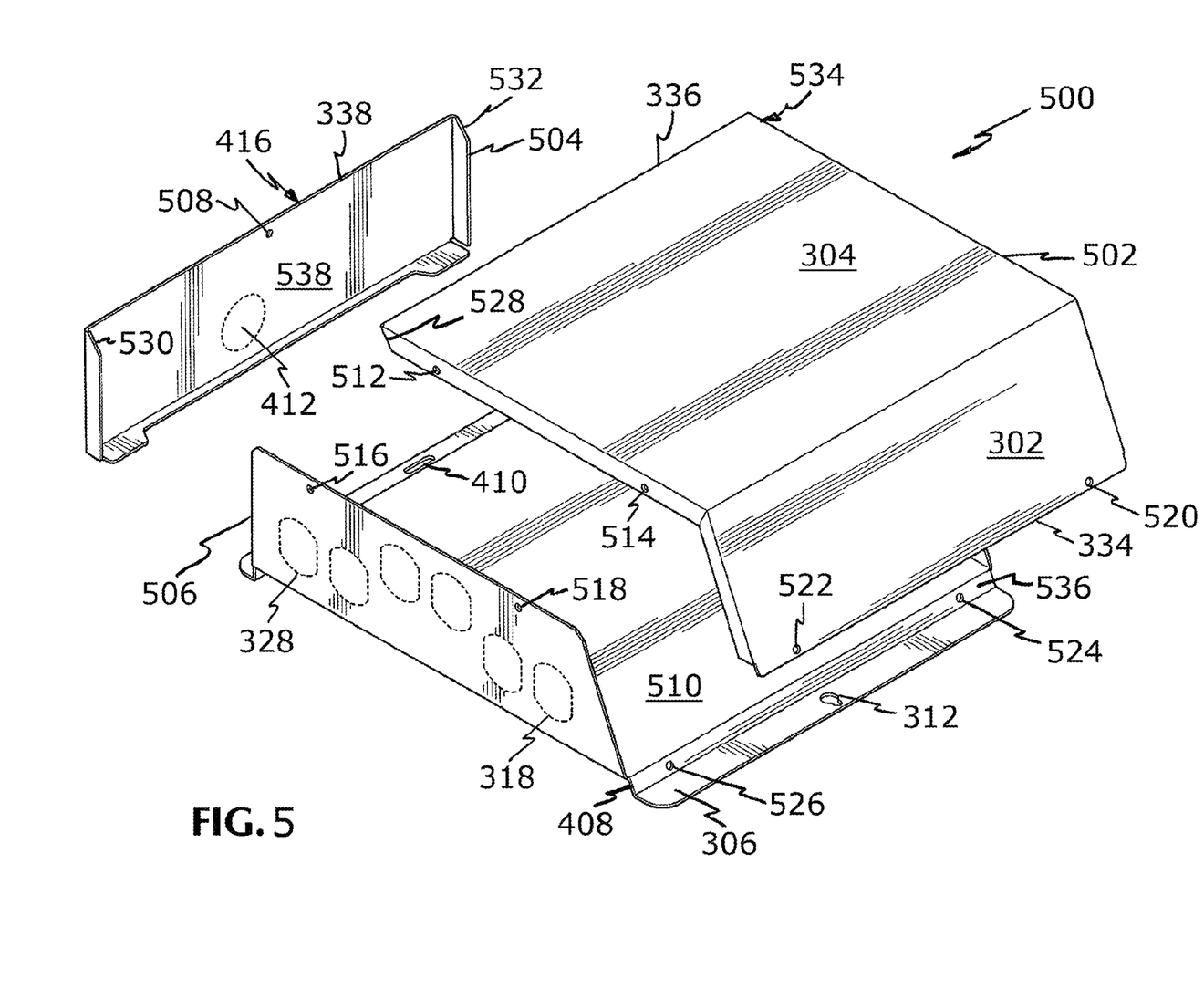
FIG. 5 shows an exploded perspective view of a lighting controller chassis as viewed from the front, according to preferred embodiments.
Figure 6:
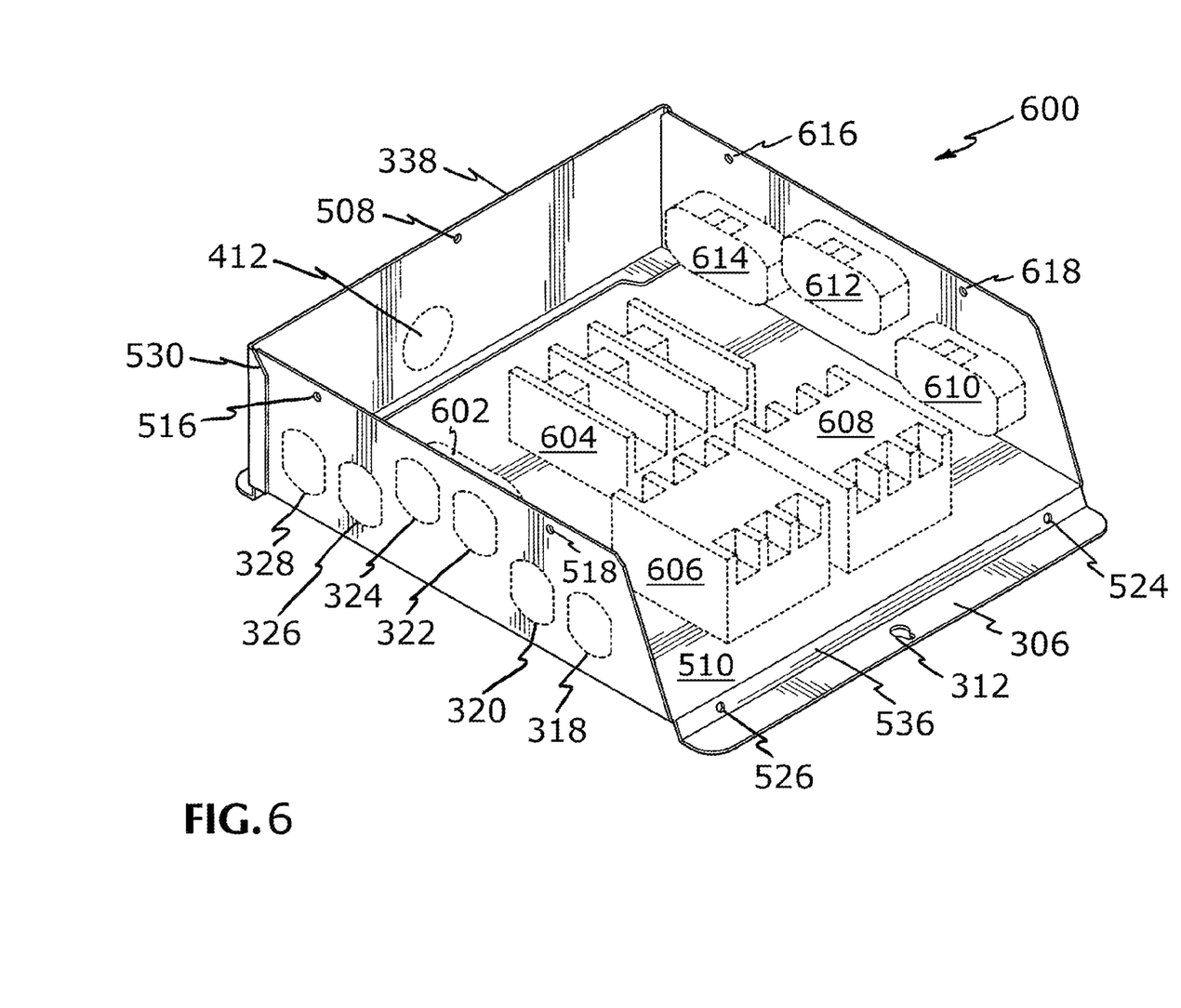
FIG. 6 shows a perspective partial view of a lighting controller as viewed from the front, with front cover removed to reveal components therewithin, according to various preferred embodiments.

In preferred embodiments, connecting 110 power to the lighting controller 202 comprises pulling 112 wires into the already mounted chassis (for example, pulling 112 wires up through an opening 412 in a lower backplane enclosure member 504 as shown in FIG. 5) and connecting 114 the power wires to terminal blocks 604 as shown in FIG. 6, or other connections within a backplane component assembly portion 600 of the lighting controller chassis 202. In preferred embodiments, connecting 110 power further comprises tightening 116 lugs on the terminal blocks, for example using an Allen wrench on Allen-type lugs comprising the terminal blocks.

Figure 3:
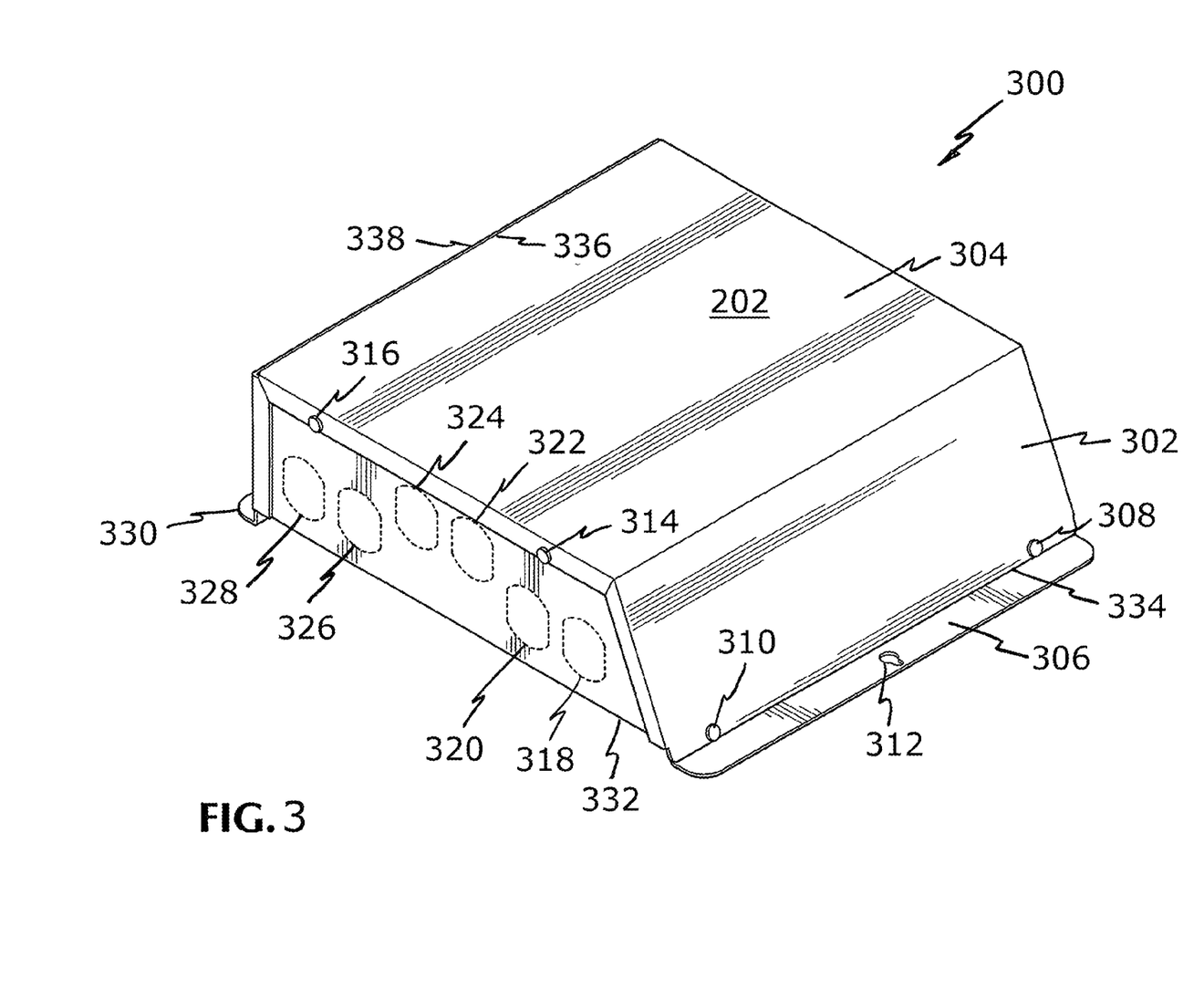
FIG. 3 shows a perspective view of a lighting controller chassis as viewed from the front, according to various embodiments.
Figure 4:
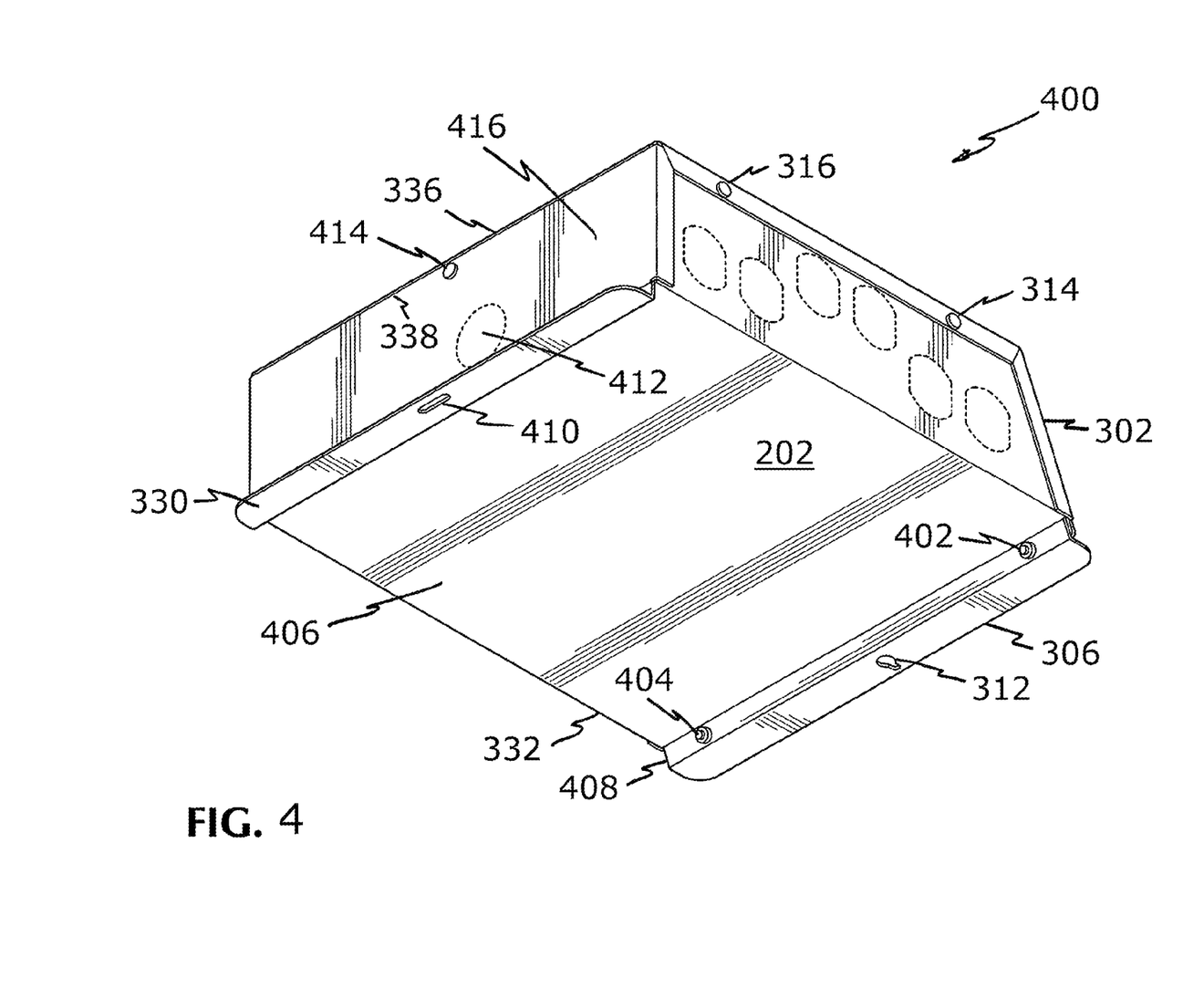
FIG. 4 shows a perspective view of a lighting controller chassis as viewed from the rear, according to various embodiments.

In preferred embodiments, replacing 118 the front cover plate 502 comprises re-attaching the front panel 502 by setting 120 the cover plate lower edge 336 on a chassis backplane assembly lower edge 338 (as depicted in FIGS. 3, 4, and 5), rotating 122 the front cover onto the rest of the backplane assembly 600 so that the lower edge 336 of the front cover 502 rests on the lower edge 338 of the lower backplane enclosure member 504 and the front cover upper edge 334 rests against a corresponding mating upper surface 536 of the backplane 510, and replacing 124 and/or tightening at least one fastener or latch member for retaining the front cover plate 502 to the backplane assembly 600.

Figure 2:
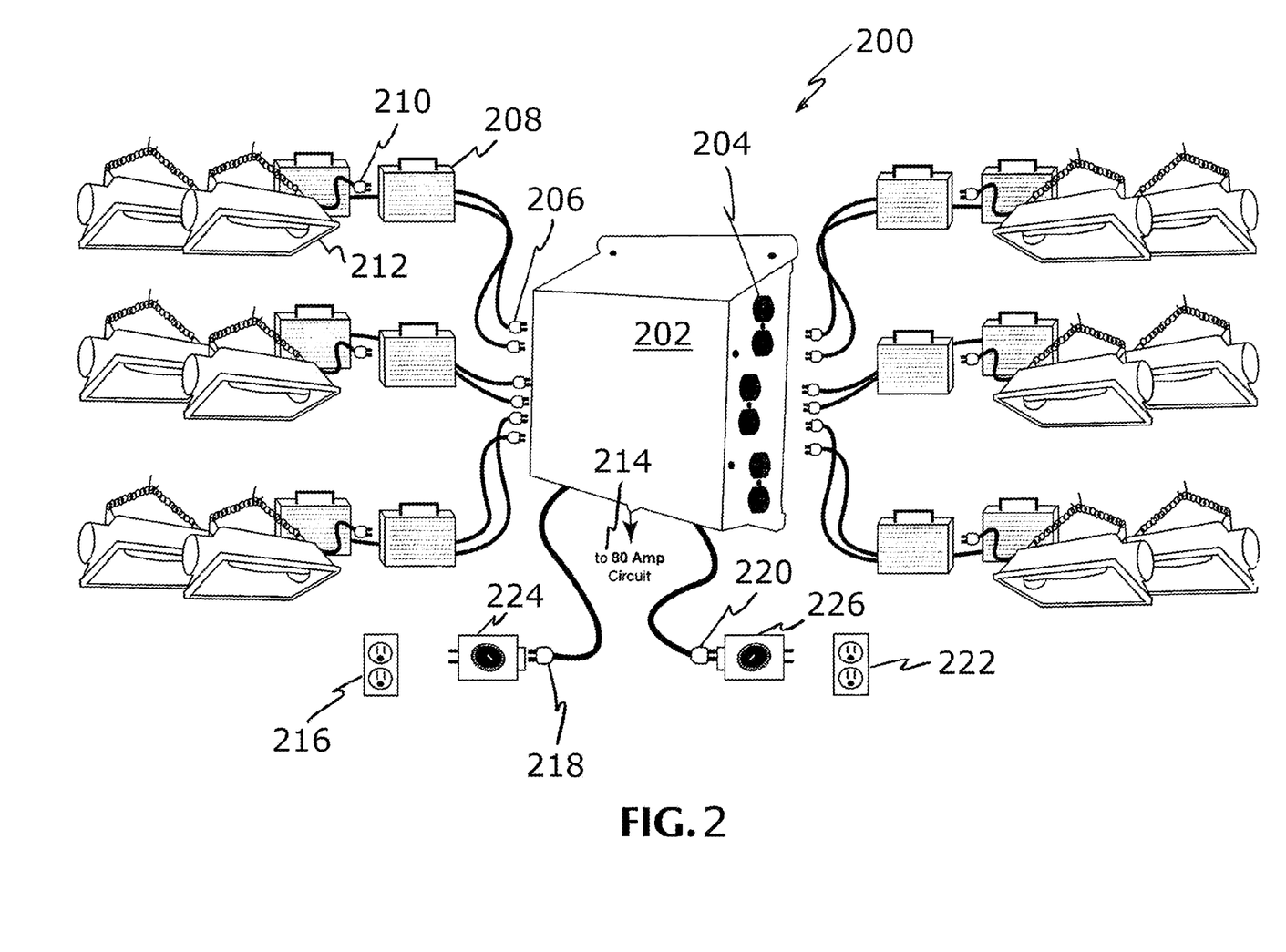
FIG. 2 shows an exemplary application diagram for a lighting controller, according to preferred embodiments.

FIG. 2 shows an exemplary application diagram 200 for a lighting controller 202, according to preferred embodiments. The controller chassis 202 preferably comprises multiple controlled power outlets 204. In one preferred embodiment, the controller 202 comprises a 12-light 240 volt controller having twelve (12) power outlets 204 capable of connectably receiving an equal number of electrical plugs 206 for connecting up to twelve (12) 240 volt ballasts 208, which in turn receive twelve (12) electrical plugs 210 for connecting and energizing twelve (12) lighting fixtures 212. The 12-light controller, as shown, may be connected to a power circuit 214 such as an 80 amp circuit. Six (6) of the controller power outlets 204 are preferably oriented and positioned on each side of the controller chassis, with six (6) power outlets 204 providing 240 volt power when a 30 amp relay/contactor is energized by one of the trigger cords 220, 224. As shown, the six (6) 240 volt outlets 204 shown on the right side of the controller chassis are energized when a 30 amp relay/contactor is energized when the trigger cord 220 is plugged into 120 volt external power outlet 222 (or optionally via timed operation using timing appliance 226). The six (6) controller power outlets 204 on the left side of the controller chassis (not shown) are likewise configured to provide 240 volt power when a second 30 amp relay/contactor is energized, for example, by trigger cord 218 when the trigger cord 218 is energized.

In one embodiment, the controller 202 comprises a Helios 18 204 volt 12-light controller from Titan Controls and distributed by Sunlight Supply, Inc., and each of the timing appliances 224, 226 comprise an Apollo Series 24 hour timer, also from Titan Controls and distributed by Sunlight Supply, Inc. See the website www.sunlightsupply.com. In a preferred embodiment, the controller 202 comprises a 12-light, 240 volt controller with dual trigger cords, capable of running 12 high intensity discharge (HID) lights at 240 volts each and featuring industrial grade ballast rated relays; the dual trigger cord sets allowing the operator to run two separate light timing schedules; the controller featuring a removable front cover that makes the controller easy to wire into a power system, and featuring a durable, 20-gauge, powder-coated steel enclosure/chassis; the controller features an 80 amp input power and 60 amp output power.

FIG. 3 shows a perspective view 300 of a lighting controller 202 as viewed from the front, according to various embodiments. The controller 202 preferably comprises a front surface 304 that, in one embodiment, forms a front cover that is removable from the rest of the controller 202 without the need for detaching the controller 202 from its mounting (for example, to a wall, vertical stud member, or other mounting orientation), or detaching any electrical plugs 206 that may be connected to power outlets 204 (such as power outlets 318, 320, 322, 324, 326, and/or 328, and/or one or more power outlets (not shown) on the other/opposite side of the controller 202), or disconnecting wiring or facilities that may be associated with power circuit 214, or disconnecting any other wiring or internal components of the controller 202. In more preferred embodiments, a front cover of the controller 202 comprises a front surface 304 and an inclined top surface 302, with the front cover being removable from the rest of the controller 202 without the need for detaching the controller 202 from its mounting (for example, to a wall, vertical stud member, or other mounting orientation), or detaching any electrical plugs 206 that may be connected to power outlets 204, or disconnecting wiring or facilities that may be associated with power circuit 214, or disconnecting any other wiring or internal components of the controller 202.

Preferably, the front cover of controller 202 is removably repeatably fastenable to the rest of the controller 202 by one or more fasteners that may be loosened or removed to release the front cover from the rest of the controller 202. The inventor discovered that the removable front cover of controller 202 improves not only ease of installation and use by consumers, but also manufacturability of the controller since process steps in manufacturing may be more easily rearranged and optimized due to an easier to install/remove/replace front cover that needs no collateral disassembly or replacement of other controller components. As shown in FIG. 3, a front cover comprising a front surface 304 and a top inclined surface 302 may be repeatably removed by loosening or removing one or more fasteners such as fasteners 314 and 316 (and other fasteners (not shown) on the other/opposite side of the controller 202), and loosening or removing one or more fasteners such as fasteners 308 and 310 at the top edge of the front cover top surface 302. In preferred embodiments, one or more fastener (for example, fastener 414 shown in FIG. 4) on the bottom surface 416 of the controller 202 near the lower edge 336 of the front cover 304 and near the lower edge 338 of the lower backplane enclosure member 504. As shown in FIGS. 3 and 4, seven (7) fasteners may be used to repeatably removably secure the front cover to the rest of the controller 202 assembly. In preferred embodiments, the one or more fasteners may be loosened so as to release the front cover, which may then be pulled away from the upper flange 306 and lower flange 330, the upper and lower flanges being part of the backplane 510. In preferred embodiments, the one or more fasteners may be loosened so as to release the front cover to allow the upper edge 334 of the front cover to be replaceably pulled away from the upper flange 306 of the backplane 510 in a reversibly rotating manner such that the lower edge 336 of the front cover 304 and lower edge of 338 of the lower backplane enclosure member 504 define an axis of rotation, whereafter rotation the front cover may be reversibly lifted away from the rest of the controller 202 assembly.

Preferably, the front cover inclined surface 302 is inclined away from being coplanar (and parallel) with front surface 304 in a direction toward the upper flange 306 (as shown in FIG. 3) by a non-zero degree angle between zero and 90 degrees, with a zero degree angle bringing the front surface 304 and top surface 302 in coplanar relationship (i.e. no inclined surface) and a 90 degree angle bringing the front surface 304 and top surface 302 in perpendicular relationship (not providing an inclined top surface, but instead providing a flat surface in relation to the mounting flanges 306 and 330 and substantially perpendicular orientation to a vertical mounting surface). In most preferred embodiments, the top surface 302 is inclined between 45 and 90 degrees in relation to the front surface 304. Or in other words, in most preferred embodiments, the inclined top surface 302 incorporates between zero and 45 degrees of angle away from a top surface 302 that is flat (or perpendicular to front surface 304) forming a shelf when the controller 202 is fully assembled mounted to a vertical surface via mounting flanges 306 and 330. Incorporating an inclined top surface 302, the inventor discovered, facilitates easier removable replacement of the front cover. The inventor also discovered incorporation of an inclined top surface 302 further provides a non-flat/non-shelf top surface for the controller 202, discouraging use of the top surface 302 as a shelf (thus improving operational organization, cleanliness, and safety in a horticulture/plant growing environment). The inventor further discovered incorporation of an inclined top surface 302 provides a non-flat top surface for the controller 202 that prevents pooling of liquids on the top surface 302, thus decreasing chances of moisture intrusion into and/or around the controller 202 (consequently reducing moisture-caused damage or injury).

FIG. 4 shows a perspective view 400 of a lighting controller 202 as viewed from the rear, according to various embodiments. In preferred embodiments, fasteners 308 and 310 for securing a top surface 302 correspond with fastener receiving nuts 404 and 402, respectively, positioned within a standoff portion 408 that forms a space between the mounting surface of upper flange 306 and the back surface 406 of the controller 202. Preferably, the mounting surface of the lower flange 330 is offset from the back surface 406 of the controller 202 so as to form a space between the mounting surface and the back surface 406. The inventor discovered that incorporation of a standoff portion so that a space is created between one or the other or both mounting flange surfaces and the back surface 406 of the controller 202 facilitates handling of the controller for easier mounting/dismounting because the sides of the controller may be grabbed and set in place on the mounting surface without having to fully remove fingers from extending from the sides and onto the back surface 406 of the controller 202. For example, a screw, hook, or other fastener may be set into a mounting surface such as on a stud member; then a person may grasp the controller 202 sides and hang the controller 202 on the mounting fastener through key hole 312 formed (preferably) substantially centrally in the upper mounting flange 306, without having to fully remove fingers that may be extending onto the back surface 406 while holding and hanging the controller 202; and the person may then similarly grasp a side of the controller 202 to hold it in place as a fastener such as a screw is driven through the lower mounting flange slot 410. The inventor further discovered that incorporation of a standoff portion so that a space is created between one or the other or both mounting flange surfaces and the back surface 406 of the controller 202 facilitates air circulation between the mounting surface and the back surface 406 of the controller 202, thus improving dissipation of heat that may be conducted through the back surface 406 from components within the controller 202 and allowing for evaporation of any moisture caught between the mounting surface and the back surface 406 of the controller 202.

In preferred embodiments, the opening 412 in the bottom surface 416 is, as shown in FIG. 4, offset from the lower mounting slot 410 in the lower/bottom flange 330, as the inventor discovered such positioning facilitates easier adjustment of the controller mounting, re-adjustments, and initial or re-wiring of power to the controller 202.

FIG. 5 shows an exploded perspective view 500 of a lighting controller chassis as viewed from the front, according to preferred embodiments. The controller chassis preferably comprises a front cover 502, a lower backplane enclosure member 504, and a backplane 510. All three primary components shown in FIG. 5 of the controller chassis, according to preferred embodiments, comprise sheet material (such as sheet metal) folded or formed (such as by using press brake type tooling and equipment) to create an enclosure or chassis. The front cover 502 preferably comprises a front surface 304 and an inclined top surface 302. In preferred embodiments, an upper edge 334 of the front cover 502 includes one or more fastener receiving hole (such as holes 520 and 522) aligned with corresponding holes 524 and 526 in a front cover receiving portion 536 of the backplane 510. Preferably the front cover receiving portion 536 comprises a surface portion of the backplane 510 that extends at least partially across a standoff portion 408. The front cover 502, in preferred embodiments, incorporates folded over side material within which may be one or more fastener receiving holes, such as holes 514 and 512 (and (not shown) holes on the other/opposite side of the front cover 502). Holes 514 and 512 preferably align with corresponding holes 518 and 516, respectively, in the side 506 extending from backplane 510. Likewise, holes (not shown) in front cover 502 opposite 514 and 512 preferably align with corresponding holes 618 and 616, respectively, in the side of backplane 510 opposite side 506. The front cover 502 also preferably includes miter cuts 528 and 534, as shown, for correspondingly mating with miter cuts 530 and 532, respectively, in the lower backplane enclosure member 504.

The backplane 510 of the controller 202, in preferred embodiments, comprises, as shown, a substantially planar backplane surface opposite the back surface 406 between an upper (top) flange 306 and lower (bottom) flange 330, with standoff portions (such as standoff portion 408) between each (mounting) flange and the backplane surface, and sides 506 extending outward from the backplane surface, the sides having one or more cutouts to accommodate power outlets 204 (for example, cutouts for power outlets 318 and 328). The turned over sides of the front cover 502 preferably overlap the sides 506 when the front cover 502 is closed over the backplane 510. In similar fashion, the lower backplane enclosure member 504 preferably includes turned over sides that overlap the sides 506 when the lower backplane enclosure member 504 is assembled to the backplane 510.

FIG. 6 shows a perspective partial view 600 of a lighting controller 202 as viewed from the front, with front cover removed to reveal components therewithin, according to various preferred embodiments. Each of the power outlets 204 are, in various embodiments, associated with internal components such as dual outlets 602, 610, 612, 614, and those (not shown) associated with power outlets 318, 320, 326, and 328. Wiring (not shown) preferably interconnects the power outlets with a relay/contactor, such as relay/contactor 608, 606. And the one or more relay/contactor 608, 606 is preferably wired to the power terminal block 604. In preferred embodiments, the power outlets are affixed to the sides 506 of the backplane 510, and the relay/contactor 608, 606 and power terminal block 604 are affixed to the backplane surface of the backplane 510.

Figure 7:
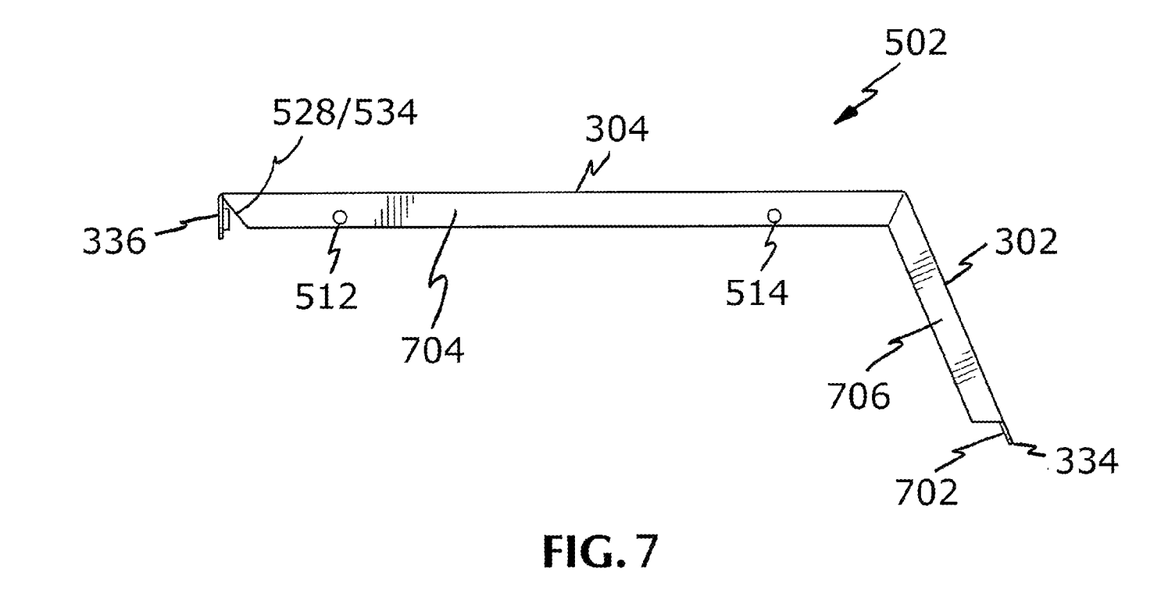
FIG. 7 shows a right side view of a front cover of a lighting controller chassis, according to preferred embodiments.

FIG. 7 shows a right side view of a front cover 502 of a lighting controller chassis, according to preferred embodiments. In most preferred embodiments, a front cover 502 comprises a top surface 302 extending to an upper edge 334 and an underside 702 of the upper edge portion sized to matingly engage with a front cover receiving portion 536 (also referred to as a corresponding mating upper surface 536) of the backplane 510 (shown in FIGS. 5 and 6). The front cover 502 further preferably includes turned over sides 706 along the sides of the top surface 302 and turned over sides 704 along the sides of the front surface 304, the turned over sides 704 along the sides of the front surface 304 having miter cuts 528, 534 as shown. The inventor discovered the turned over sides such as sides 704 and 706 improve the controller 202 in terms of repelling dust, rust, and moisture.

Also shown in FIG. 7, the lower edge 336 of the front cover 502 preferably comprises a turned over edge with lower surface of sufficient area to allow the cover 502 to rest on the lower edge 338 of the lower backplane enclosure member 504. As shown in FIG. 5, the lower edge 338 of the lower backplane enclosure member 504 preferably comprises the width-wise edge extending from each miter cut 530 and 532. In preferred embodiments, the lower edge 336 of the front cover 502, when the front cover 502 is fully assembled to the backplane 510 and lower backplane enclosure member 504, rests on the inside surface 538 portion nearest the lower edge 338 of the lower backplane enclosure member 504. In preferred embodiments, the lower edge 336 of the front cover 502, when the front cover 502 is being assembled to the backplane 501 and lower backplane enclosure member 504, initially rests on the lower edge 338 of the lower backplane enclosure member 504 and forms an axis of rotation as the front cover 502 is rotated to close over the backplane 510.

Figure 8:
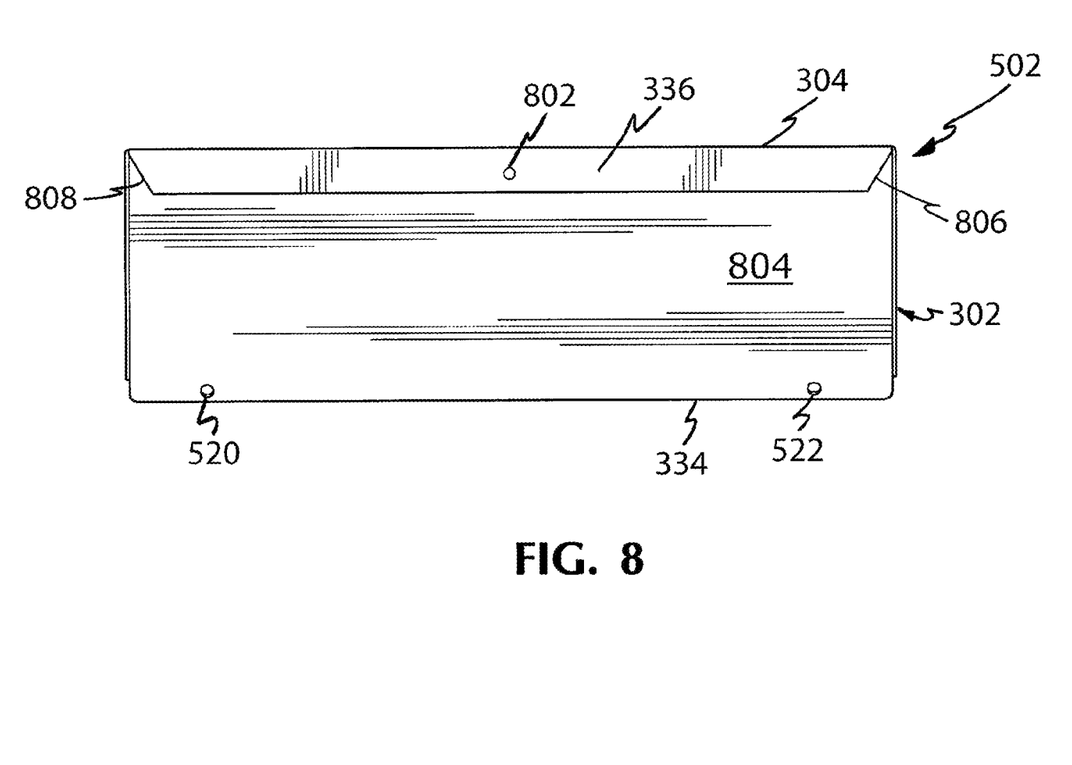
FIG. 8 shows a bottom elevation view of the front cover shown in FIG. 7, according to preferred embodiments.

FIG. 8 shows a bottom elevation view of the front cover 502 shown in FIG. 7, according to preferred embodiments. The inside surface 804 opposite the top surface 302 is shown extending toward upper edge 334 of the top cover 502. In preferred embodiments, a fastener receiving hole 802 is placed on the lower edge 336 of the front cover 502, aligned with corresponding fastener receiving hole 508 in the lower backplane enclosure member 504. In most preferred embodiments, the lower edge 336 of the front cover 502 comprises cutouts 806 and 808 at each end that (the inventor discovered) provide additional clearance to avoid interference with sides 506 of the backplane 510 when initially resting the lower edge 336 of the front cover 502 on the lower edge 338 of the lower backplane enclosure member 504 and when closing the front cover 502 over the backplane 510. The inventor further discovered that the cutouts 806 and 808 at the ends of the lower edge 336 provide clearance to allow sliding the front cover 502 along sides 506, with the turned over edges 704 wrapping over the edges 506 of the backplane 510 and acting as guides, making it easier to replace the front cover 502.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A method of installing and using a lighting controller 202 comprising steps of:
    providing 102 an assembled lighting controller having a chassis enclosure for enclosing one or more power outlets 204 and wiring means for selectably providing electrical power to said one or more power outlets 204, the chassis enclosure and internal components defining a backplane assembly 600, and a removable front cover plate 502;
    fully mounting 104 the assembled lighting controller 202 to a vertical mounting surface;
    loosening or removing 106 one or more fasteners or latch members retaining the front cover plate of the controller chassis to the assembled lighting controller;
    removing 108 the front cover plate from the rest of the assembled lighting controller 202;
    connecting 110 wiring to provide electrical power to wiring means of the controller 202;
    replacing 118 the front cover plate to the rest of the assembled lighting controller;
    activating 126 power to energize the wiring connected to provide power to the controller; and
    plugging 134 in at least one ballast 208 or self-ballasted lighting fixture into one of the controller power outlets 204 for energizing a lighting fixture 212 or self-ballasted lighting fixture.

2. The method of claim 1 further comprising inserting 138 a timing appliance 226, 224 between a trigger cord 220, 218 and an external power outlet 222, 216 providing power to the trigger cord 220, 218.

3. The method of claim 2 wherein inserting 138 a timing appliance 226, 224 between the trigger cord 220, 218 and the external power outlet 222, 216 allows for setting a schedule for on/off operation of the connected lighting fixture 212.

4. The method of claim 2 wherein inserting 138 a timing appliance comprises inserting 140 a 120 volt timing appliance 226, 224 between a 120 volt external power outlet 222, 216 and a trigger cord 220, 218.

5. The method of claim 1 further comprising steps of testing 128 one or more of the lighting controller power outlets 204 by plugging 130 a trigger cord 220, 218 in to an external power outlet 222, 216 corresponding to the particular controller power outlet 204 to be tested, and
    checking 132 the voltage available at the power outlet 204 to be tested.

6. The method of claim 1 wherein mounting 104 the fully assembled lighting controller 202 is: without having to remove any component of the lighting controller 202; without having to remove a front cover 502; without having to perform any wiring connections on a backside of the controller chassis; and without having to pre-wire any connections associated with operation of said lighting controller 202.

7. The method of claim 1 wherein loosening or removing 106 one or more fasteners or latch members comprises loosening each one of multiple fasteners enough to release front cover 502 from the rest of the assembled lighting controller 202.

8. The method of claim 1 wherein connecting 110 wiring to provide electrical power comprises connecting said wiring means to an 80 amp external circuit to provide power to the controller 202.

9. The method of claim 1 wherein replacing 118 the front cover plate 502 further comprises tightening each one of multiple fasteners previously loosened to remove the front cover 502.

10. The method of claim 1 wherein plugging 134 in at least one ballast 208 for energizing a lighting fixture 212 comprises plugging 136 in the lighting fixture 212 to the ballast 208.

11. The method of claim 1 wherein mounting 104 the fully assembled lighting controller 202 comprises using a first fastener to hang the controller 202 on a vertical mounting surface and a second fastener to further secure the controller 202 to the mounting surface.

12. The method of claim 11 wherein the first fastener is used in a key-hole shaped cutout 312 in a top flange 306 of the controller 202, and the second fastener is used in a slot-shaped cutout 410 in a bottom flange 330 of the chassis 202, where both fasteners when fastened secure a backplane 510 of the controller 202 to the mounting surface, allowing for separate and in-operation removal of the front cover plate 502 of the lighting controller controller 202.

13. The method of claim 1 wherein connecting 110 power to the lighting controller 202 comprises pulling 112 wires into an already mounted controller 202, up through an opening 412 in a lower backplane enclosure member 504 and connecting 114 the power wires to a terminal block 604.

14. The method of claim 13 wherein connecting 110 power further comprises tightening 116 lugs on the terminal block 604.

15. The method of claim 1 wherein replacing 118 the front cover plate 502 comprises steps of re-attaching the front panel 502 by setting 120 a cover plate lower edge 336 on a controller backplane assembly lower edge 338, rotating 122 the front cover onto the rest of the backplane assembly 600 so that the lower edge 336 of the front cover 502 rests on the lower edge 338 of the lower backplane enclosure member 504 and the front cover upper edge 334 rests against a corresponding mating upper surface 536 of the backplane assembly 600, and tightening 124 at least one fastener or latch member for retaining the front cover plate 502 to the backplane assembly 600.

16. The method of claim 1 wherein removing 108 the front cover plate 502 of the lighting controller 202 comprises steps of:
  rotating 122 the front cover 502 away from the rest of the backplane assembly 600 so that a cover plate lower edge 336 of the front cover 502 rests on a lower edge 338 of the lower backplane enclosure member 504 as the front cover upper edge 334 moves away from a corresponding mating upper surface 536 of the backplane assembly 600; and
  detaching the front panel 502 by pulling the cover plate lower edge 336 away from the lower edge 338 of the lower backplane enclosure member 504.

* * * * *